US008450890B2

(12) United States Patent
Chamberlin et al.

(10) Patent No.: US 8,450,890 B2
(45) Date of Patent: May 28, 2013

(54) ROTATING DIRECTIONAL COOLANT SPRAY FOR ELECTRIC MACHINE

(75) Inventors: Brad Chamberlin, Pendleton, IN (US); Larry Kubes, Climax, MI (US); Koon Hoong Wan, Indianapolis, IN (US)

(73) Assignee: Remy Technologies, L.L.C., Pendleton, IN (US)

( * ) Notice: Subject to any disclaimer, the term of this patent is extended or adjusted under 35 U.S.C. 154(b) by 0 days.

(21) Appl. No.: 12/627,294

(22) Filed: Nov. 30, 2009

(65) Prior Publication Data
US 2010/0141062 A1  Jun. 10, 2010

(51) Int. Cl.
*H02K 1/32* (2006.01)
*H02K 9/00* (2006.01)

(52) U.S. Cl.
USPC ............... 310/61; 310/52; 310/58; 310/59

(58) Field of Classification Search
USPC .......................... 310/61, 52, 58, 59
See application file for complete search history.

(56) References Cited

U.S. PATENT DOCUMENTS

| | | | | |
|---|---|---|---|---|
| 2,891,391 A * | 6/1959 | Grant et al. | ...................... | 62/475 |
| 2,947,892 A * | 8/1960 | Inculet et al. | .................... | 310/57 |
| 3,007,064 A * | 10/1961 | Ward | .............................. | 310/54 |
| 3,110,827 A * | 11/1963 | Baudry | ........................... | 310/55 |
| 3,188,833 A * | 6/1965 | Robinson | ....................... | 62/505 |
| 3,435,263 A * | 3/1969 | Willyoung | ..................... | 310/61 |
| 3,439,202 A * | 4/1969 | Wanke | ............................ | 310/52 |
| 3,558,943 A * | 1/1971 | Nilsson | ........................... | 310/58 |
| 3,618,337 A * | 11/1971 | Mount | ............................ | 62/505 |
| 3,701,911 A * | 10/1972 | Hallerback | ................. | 310/60 R |
| 3,932,778 A * | 1/1976 | Watanabe et al. | ............... | 310/61 |
| 4,301,386 A * | 11/1981 | Schweder et al. | .............. | 310/59 |
| 4,365,178 A * | 12/1982 | Lenz | ................................ | 310/61 |
| 4,745,315 A * | 5/1988 | Terry et al. | .................. | 310/68 D |
| 4,845,394 A * | 7/1989 | Kleinhans | ....................... | 310/64 |
| 5,019,733 A * | 5/1991 | Kano et al. | ...................... | 310/61 |
| 5,319,272 A * | 6/1994 | Raad | ............................ | 310/68 D |
| 5,757,094 A * | 5/1998 | van Duyn | ....................... | 310/58 |
| 5,889,342 A * | 3/1999 | Hasebe et al. | ................. | 310/54 |
| 6,340,853 B1 * | 1/2002 | Kaiho et al. | .................... | 310/61 |

(Continued)

FOREIGN PATENT DOCUMENTS

| | | | | |
|---|---|---|---|---|
| JP | 2003009467 | A | * | 1/2003 |
| JP | 2003169448 | A | * | 6/2003 |
| JP | 2006353086 | A | | 12/2006 |

OTHER PUBLICATIONS

Machine translation of foreign document JP 2003009467.*

(Continued)

*Primary Examiner* — Tran Nguyen
*Assistant Examiner* — Alex W Mok
(74) *Attorney, Agent, or Firm* — Cantor Colburn LLP

(57) ABSTRACT

Disclosed is a rotor for a fluid cooled electric machine including a rotor shaft rotably located at a central axis and a plurality of rotating coolant passages extending outwardly from the rotor shaft to direct a flow of coolant to a desired impingement location on the electric machine thereby removing thermal energy from the impingement location. Further disclosed is a fluid cooled electric machine including a plurality of coolant passages each including at least one coolant passage inlet and at least one coolant passage outlet, the plurality of coolant passages configured to rotate about the central axis and direct a flow of coolant therethrough to a desired impingement location thereby removing thermal energy from the impingement location.

17 Claims, 4 Drawing Sheets

U.S. PATENT DOCUMENTS

| | | | | |
|---|---|---|---|---|
| 7,173,358 B2 * | 2/2007 | Drubel | | 310/201 |
| 7,816,824 B2 * | 10/2010 | Jockel | | 310/57 |
| 2003/0011253 A1 * | 1/2003 | Kalsi et al. | | 310/58 |
| 2004/0036367 A1 * | 2/2004 | Denton et al. | | 310/61 |
| 2005/0206251 A1 | 9/2005 | Foster | | |
| 2008/0143200 A1 * | 6/2008 | Kalsi et al. | | 310/58 |

OTHER PUBLICATIONS

International Preliminary Report on Patentability for PCT Application No. PCT/US2010/055658, dated Jun. 14, 2012, pp. 1-5.

* cited by examiner

ROTATING DIRECTIONAL COOLANT SPRAY FOR ELECTRIC MACHINE

BACKGROUND OF THE INVENTION

The subject matter disclosed herein generally relates to electric machines. More specifically, the subject disclosure relates to fluid cooling of electric machines.

In some electric machines, a liquid coolant, typically oil, is utilized to cool the electric machine. The coolant is utilized to improve heat rejection from the machine and prevent damage to the machine caused by overheating. The cooling schemes typically utilize a cooling jacket that extends circumferentially around the exterior of the stator of the electric machine. Coolant is flowed through the cooling jacket to remove heat from the stator. While this method is useful in removing heat from the stator laminations, which the cooling jacket is in contact with, but the cooling jacket is less effective in cooling the stator end turns, since the cooling jacket does not directly contact the end turns. The art would well receive improvements in coolant-based heat removal from electric machines.

SUMMARY

Disclosed is a rotor for a fluid cooled electric machine including a rotor shaft rotably located at a central axis and a plurality of rotating coolant passages extending outwardly from the rotor shaft to direct a flow of coolant to a desired impingement location.

Also disclosed is a fluid cooled electric machine including a stator including at least one conductor and a rotor located radially inboard of the stator. The rotor includes a rotor shaft rotably located at a central axis and a plurality of rotating coolant passages extending outwardly from the rotor shaft to direct a flow of coolant to a desired impingement location at the stator.

Further disclosed is a method for cooling an electric machine including flowing a coolant substantially outwardly in a rotor of the electric machine. The coolant is urged through a plurality of coolant passages rotating about a central axis of the electric machine and from the plurality of coolant passages toward a desired impingement location. The coolant impinges on the desired impingement location thereby removing thermal energy from the impingement location.

BRIEF DESCRIPTION OF THE DRAWINGS

Referring now to the drawings wherein like elements are numbered alike in the several Figures.

DETAILED DESCRIPTION

Figure 1:
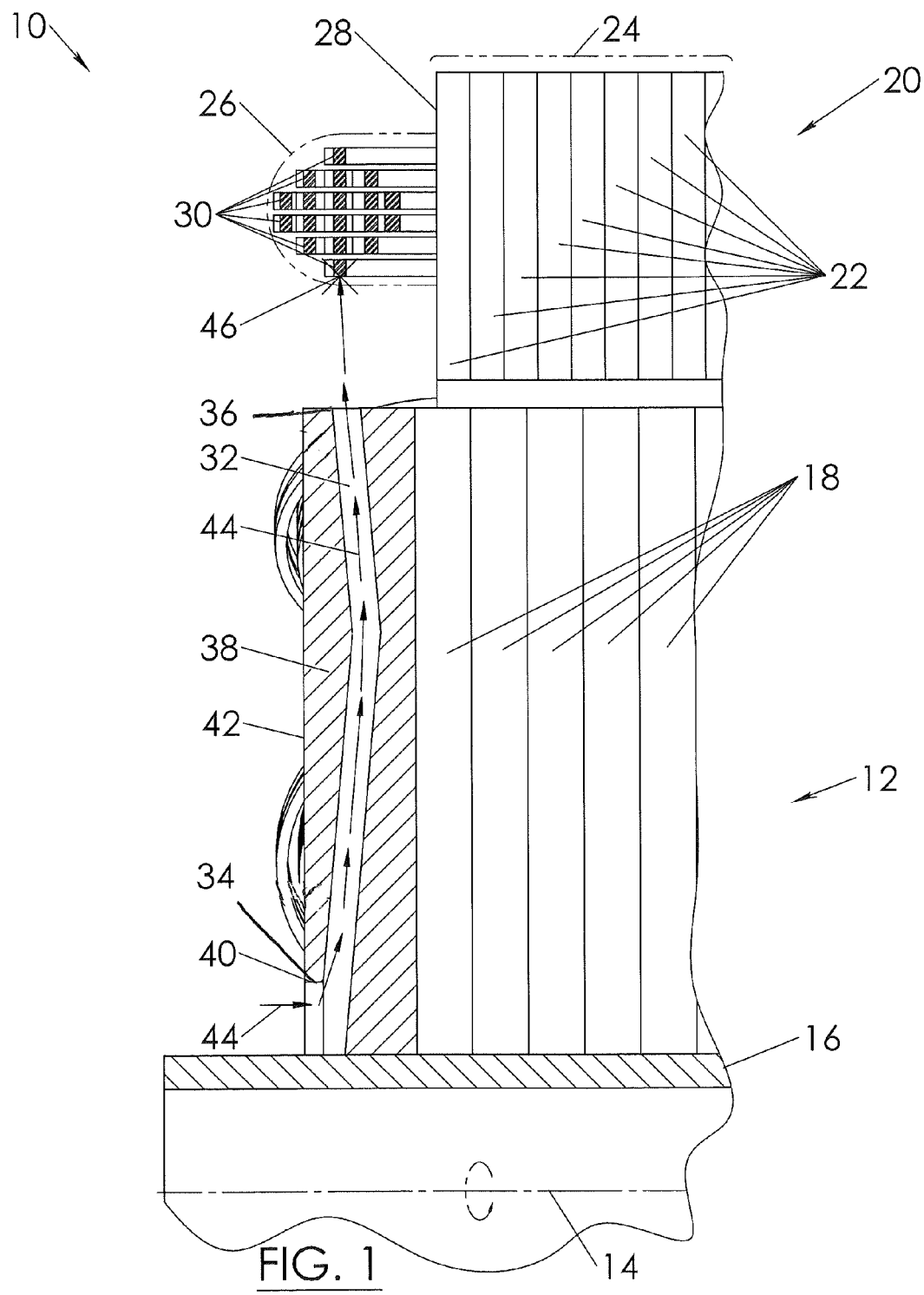
FIG. 1 is a partial cross-sectional view of an embodiment of an electric machine.

Shown in FIG. 1 is a cross-sectional view of an embodiment of an electric machine 10, for example, an alternator or generator. The electric machine 10 includes a rotor 12 rotably located at a central axis 14 of the electric machine 10. The rotor 12 comprises a rotor shaft 16 and, in some embodiments, a plurality of rotor laminations 18 affixed to an outboard surface of the rotor shaft 16. A stator 20 is disposed radially outboard of the rotor 12. The stator 20 extends axially along a length of the rotor 12 and substantially circumferentially surrounds the rotor 12. The stator 20 includes a plurality of stator laminations 22 which in some embodiments are arranged substantially axially to form a stator core 24. A plurality of conductors 26 pass through the stator core 24. At each end 28 of the stator core 24, the conductors 26 exit the stator core 24 and reenter, forming end turns 30.

The rotor 12 includes a plurality of coolant passages 32. Each coolant passage 32 of the plurality of coolant passages 32 extends from a passage entrance 34 outwardly toward a passage exit 36. In some embodiments, the coolant passages 32 extend outwardly in a radial direction. Further, in some embodiments, as shown in FIG. 1, the passage entrance 34 is disposed radially near the rotor shaft 16. It is to be appreciated, however, that the passage entrance 34 may be located in other radial locations. Alternatively, the plurality of coolant passages 32 may extend both radially and axially, and may be other shapes other than linear, for example curvilinear. The plurality of coolant passages 32 may be of any suitable cross sectional shape. For example, the cross section may be a closed tubular cross section, or may be an open cross section, such as a groove or a trough. The plurality of coolant passages 32 are configured to be rotatable about the central axis 14 of the electric machine 10 and the rotation may be driven by rotation of the rotor 12. In some embodiments, the plurality of coolant passages 32 extend through a coolant passage member 38 in which the passage entrance 34 and/or the passage exit 36 may be located. The coolant passage member 38 is annular in shape with an inner diameter 40 to allow egress of the rotor shaft 16 while also controlling coolant flow from the rotor 12. In some embodiments, it may be desired to bleed off excess coolant to prevent coolant buildup in the rotor 12 via a gap between the coolant passage member 38 and the rotor shaft 16. The plurality of coolant passages 32 may be disposed at an axial end 42 of the rotor 12. In some embodiments, the coolant passage member 38 is secured to the rotor 12 at, for example, the rotor laminations 18 and/or the rotor shaft 16 at each axial end of the rotor 12. Alternatively, the plurality of coolant passages 32 may be integral to the rotor 12, for example, passing through the plurality of rotor laminations 18. Further, it is to be appreciated that the location of cooling passages 32 is not limited to the ends 42 of the rotor 12, but the coolant passages 32 may be located at any point on the rotor 12 where coolant flow is desired.

To direct coolant to a desired area, for example, the end turns 30 at either end of the electric machine 10, a flow of coolant 44, in some embodiments oil, is injected from a coolant source (not shown) into the plurality of coolant passages 32 at the passage entrances 34. As the rotor 12 rotates about the central axis 14, centrifugal forces urge the coolant 44 through the plurality of coolant passages 32 and out of the passage exits 36. The coolant flow 44 then impinges on an impingement location 46, which is determined by the position of the passage exits 36. In some embodiments, the impingement location is at the stator end turns 30. The plurality of coolant passages 32 are located and sized to direct a desired flow of coolant 44 to the impingement location 46 to reject a desired amount of heat from the impingement location 46.

Figure 2:
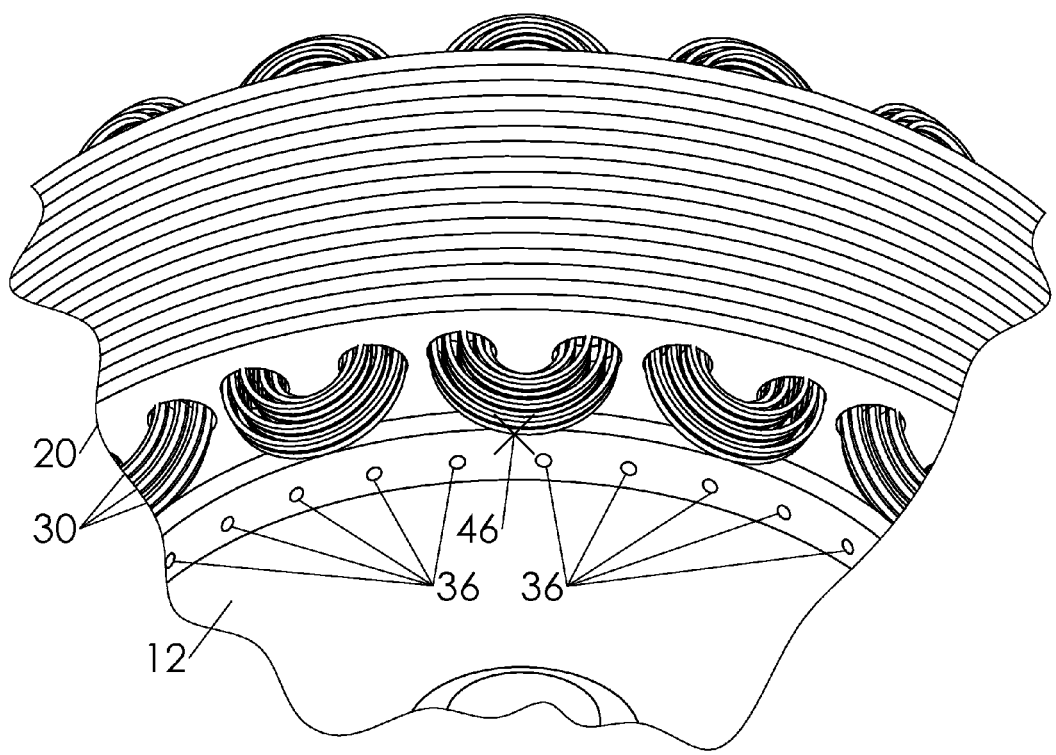
FIG. 2 is an end view of an embodiment of a rotor for electric machine.
Figure 3:
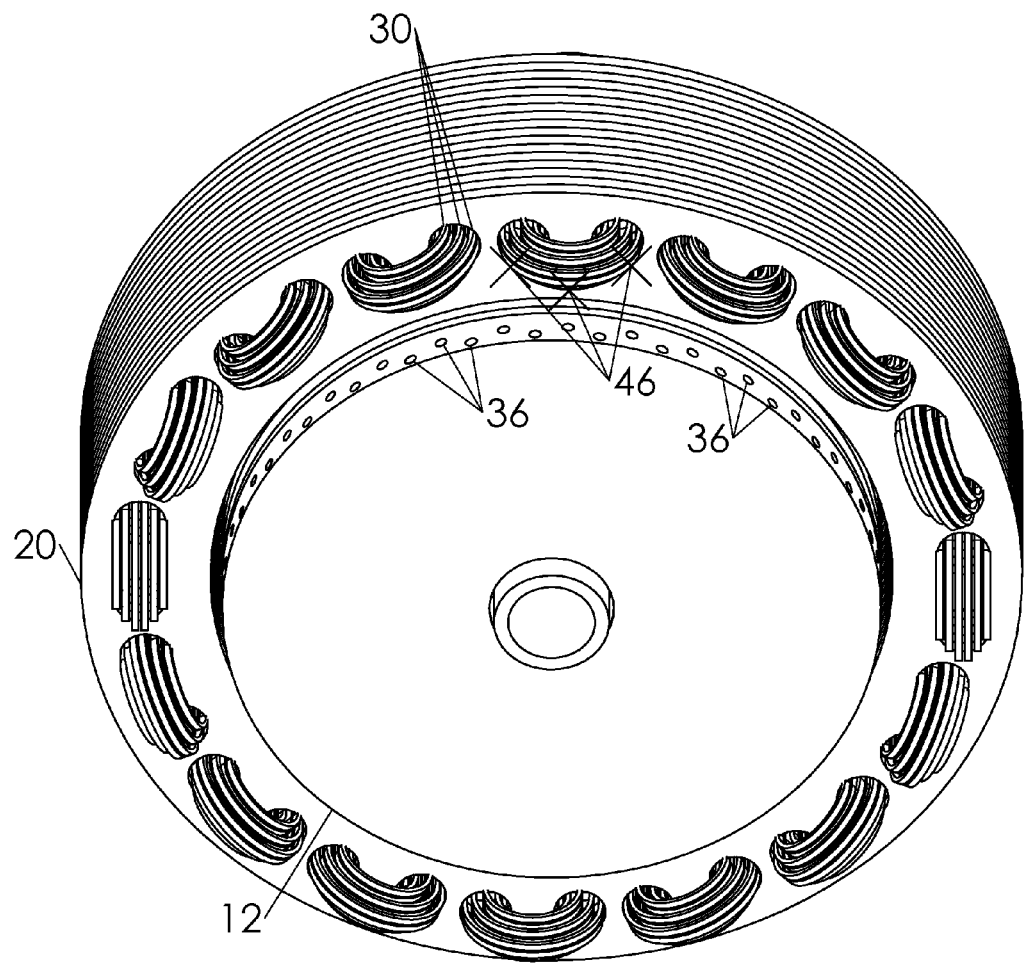
FIG. 3 is an end view of another embodiment of an electric machine.

As shown in FIG. 2, the passage exits 36 and associated coolant passages 32 are arrayed around the circumference of the rotor 12. In some embodiments, as shown, the passage exits 36 are substantially circular, but other shapes, for example, slots, may be utilized. Further, quantities of coolant passages 32 and passage exits 36 may be varied depending on the desired amount of coolant 44 to impinge at the impingement locations 46. As shown in FIG. 3, passage exits 36 located around the circumference may direct coolant 44 to substantially different impingement locations 46 to enable heat rejection at multiple impingement locations 46. Directing the coolant 44 via the plurality of coolant passages 32 to one or more desired impingement locations 46 allows for accurately applying the coolant 44 directly to points where it is desired to improve heat rejection.

Figure 4:
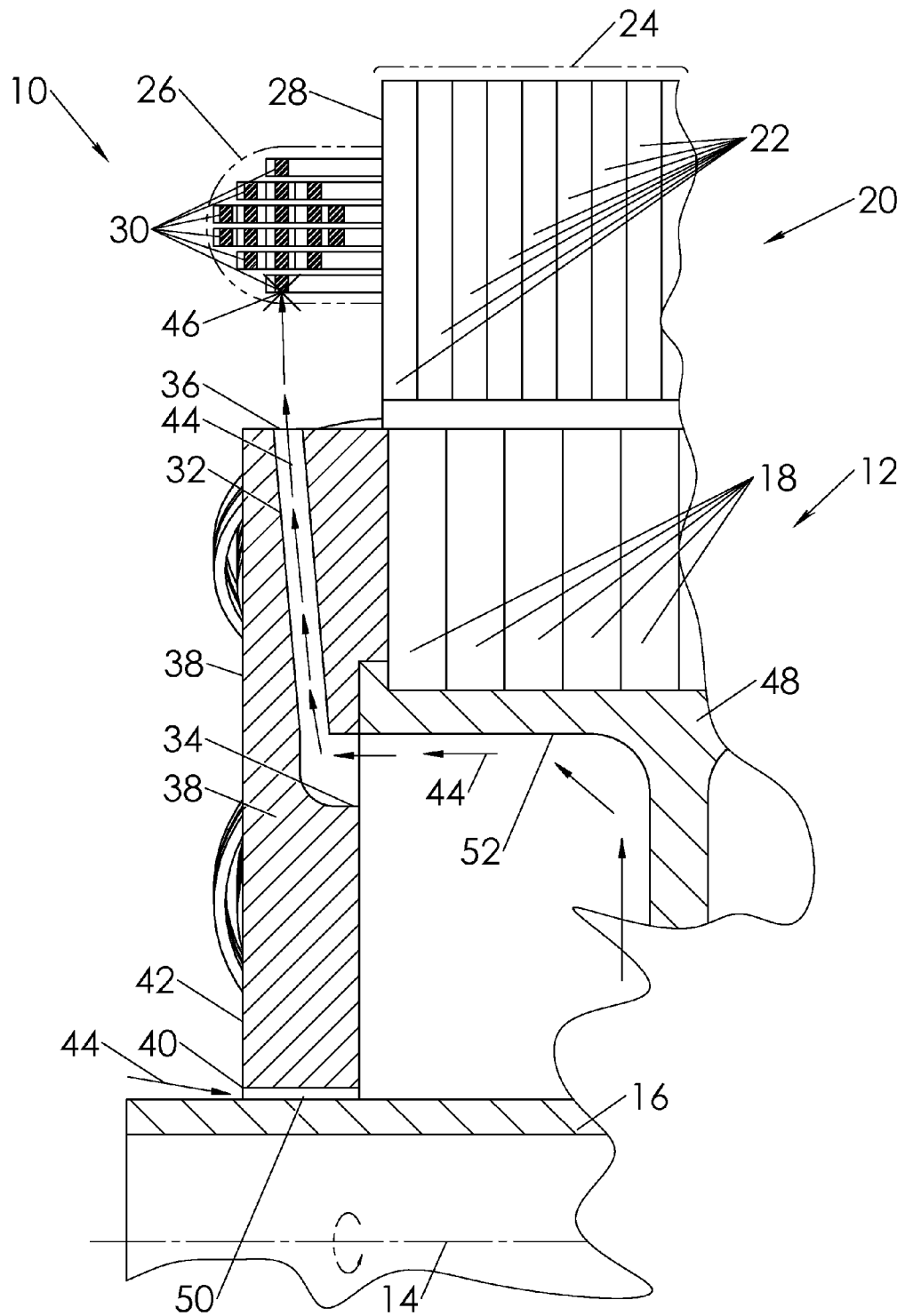
FIG. 4 is a partial cross-sectional view of yet another embodiment of an electric machine.

Shown in FIG. 4 is another embodiment of an electric machine 10. In this embodiment, a rotor hub 48 is located between the rotor shaft 16 and the plurality of rotor laminations 18, and is rotatable together with the rotor shaft 16 and plurality of rotor laminations 18 about the central axis 14. In some embodiments, coolant 44 enters the rotor 12 at, for example, a gap 50 between the rotor shaft 16 and the coolant passage member 38. With rotation of the rotor 12 about the central axis 14, the coolant 44 in the rotor 12 flows radially outwardly toward an inner wall 52 of the rotor hub 48. The coolant 44 then flows along the inner wall 52 toward the plurality of coolant passages 32. In some embodiments, to assist in directing the coolant 44 toward the plurality of coolant passages 32, the inner wall 52 may be sloped toward the desired location. The coolant 44 proceeds through the plurality of coolant passages 32 toward the impingement location 46 as described above.

While one or more embodiments have been shown and described, modifications and substitutions may be made thereto without departing from the spirit and scope of the invention. Accordingly, it is to be understood that the present invention has been described by way of illustrations and not limitation.

The invention claimed is:

1. A rotor for a liquid cooled electric machine comprising:
a rotor shaft rotatably disposed at a central axis; and
a plurality of coolant passages disposed radially inboard of a stator of the electric machine, each coolant passage extending radially along the rotor and having a closed cross-section and including at least one coolant passage inlet positioned radially outboard of the rotor shaft and at least one coolant passage outlet, the at least one coolant passage inlet being configured and disposed to receive a flow of liquid coolant passing entirely radially outwardly of the rotor shaft, the plurality of coolant passages configured to rotate about the central axis and direct a flow of liquid coolant substantially outwardly therethrough to impinge on a stator end turn of the electric machine thereby removing thermal energy from the stator end turn.

2. The rotor of claim 1 wherein the rotor comprises at least one coolant passage member disposed near an axial end of the rotor.

3. The rotor of claim 2 wherein the at least one coolant passage extends at least in part through the at least one coolant passage member.

4. The rotor of claim 2 wherein a gap between the at least one coolant passage member and the rotor shaft allows for a liquid coolant overflow from the rotor.

5. The rotor of claim 1 comprising a rotor hub disposed outboard of the rotor shaft and connected thereto.

6. The rotor of claim 5 wherein the rotor is configured to direct the liquid coolant from a rotor cavity along an inner radial wall of the rotor hub.

7. The rotor of claim 6 wherein the inner radial wall of the rotor hub is sloped toward the at least one coolant passage.

8. The rotor of claim 1 wherein individual coolant passages of the plurality of coolant passages direct the liquid coolant to substantially different impingement locations.

9. A liquid cooled electric machine comprising:
a stator comprising at least one conductor; and
a rotor disposed radially inboard of the stator comprising:
a rotor shaft rotatably disposed at a central axis; and
a plurality of coolant passages disposed radially inboard of the stator, each coolant passage extending radially along the rotor and having a closed cross-section and including at least one coolant passage inlet positioned radially outboard of the rotor shaft and at least one coolant passage outlet, the at least one coolant passage inlet being configured and disposed to receive a flow of liquid coolant passing entirely radially outwardly of the rotor shaft, the plurality of coolant passages configured to rotate about the central axis and direct a flow of liquid coolant substantially outwardly therethrough to a stator end turn of the electric machine thereby removing thermal energy from the stator end turn.

10. The electric machine of claim 9 comprising a rotor hub disposed outboard of the rotor shaft and connected thereto.

11. The electric machine of claim 10 wherein the rotor is configured to direct the liquid coolant from a rotor cavity along an inner wall of the rotor hub.

12. The electric machine of claim 11 wherein the inner wall of the rotor hub is sloped toward the at least one coolant passage.

13. The electric machine of claim 9 wherein the rotor comprises at least one coolant passage member disposed near an axial end of the rotor.

14. The electric machine of claim 13 wherein the at least one coolant passage extends at least partially through the at least one coolant passage member.

15. The electric machine of claim 9 wherein individual coolant passages direct liquid coolant to substantially different impingement locations.

16. A method for cooling stator end turns of an electric machine comprising:
injecting a liquid coolant into at least one coolant passage inlet of a plurality of coolant passages extending radially along the rotor with the liquid coolant passing entirely radially outwardly of the rotor shaft, the at least one coolant passage inlet being positioned radially outboard of a rotor shaft;
urging the liquid coolant through a the plurality of coolant passages disposed radially inboard of a stator of the electric machine rotating about a central axis of the electric machine, each coolant passage having a closed cross-section;
urging the liquid coolant from the plurality of coolant passages substantially outwardly toward a one or more stator end turns;
impinging the liquid coolant on the one or more stator end turns thereby removing thermal energy from the one or more stator end turns.

17. The method of claim 16 comprising rotating the rotor about the central axis thereby urging the radially outwardly flow of liquid coolant.

* * * * *